Jan. 12, 1954  G. C. WELCH  2,665,658
SURFACE TEST INDICATOR
Filed Oct. 5, 1949

INVENTOR.
GERALD C. WELCH
BY
atty.

Patented Jan. 12, 1954

2,665,658

UNITED STATES PATENT OFFICE 2,665,658

SURFACE TEST INDICATOR

Gerald C. Welch, Rochester, N. Y.

Application October 5, 1949, Serial No. 119,626

7 Claims. (Cl. 116—129)

The object of this invention is to provide a surface test indicator that is an improvement on the indicator shown in the prior patents issued to A. G. Cash #1,108,697 and #1,645,473.

Another object of the invention is to provide the indicator with a housing that will support and enclose a dial that can be read from either side and a pointer that is bifurcated and will indicate on both sides of the dial.

Another object of the invention is to provide a contact element that has two sizes or diameters, one enclosed in the other. That is a contact element of large diameter is provided that encloses a contact element of small diameter, it being understood that the large contact element can be removed from the contact element of small diameter when it is desired to use the one of small diameter. This feature is the subject matter of a divisional application Serial No. 293,884, filed June 17, 1952.

These and other objects of the invention will be illustrated in the drawings, described in the specification and pointed out in the claims at the end thereof.

In the drawings.

In the drawings like reference numerals indicate like parts.

Figure 2:
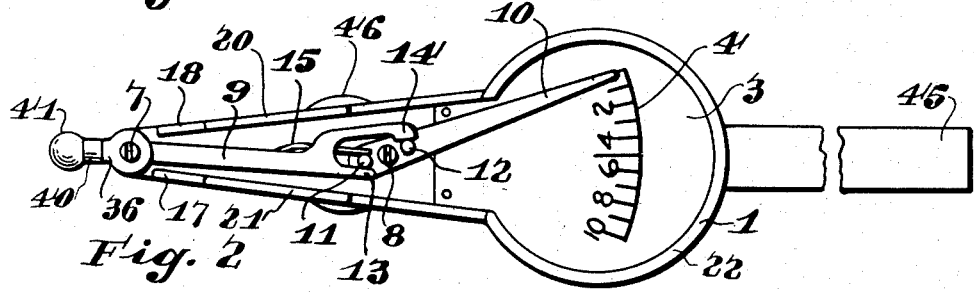
Fig. 2 is a top plan view of the surface test indicator with the cover plate removed therefrom.

In the drawings, reference numeral 1 indicates the lower part of the housing and reference numeral 2 indicates the upper part of the housing or the cover plate therefor. 3 indicates the dial plate, which is supported inside of the housing. This dial plate has the graduations 4 on each side of it. The cover of the dial plate is perforated in two places indicated at 5 and 6 and the cover plate is held on the lower part of housing by means of the screws or studs 7 and 8. Pivotally mounted on the stud 7 is the operating arm 9 shown in Figures 2 and 3. A bifurcated pointer 10 is provided, which is pivoted on the stud 8. On this pointer 10 are two studs 11 and 12. The stud 11 is engaged by projection 13 on the arm 9 by which the pointer 10 is moved in one direction and the stud 12 is engaged by the projection 14 by which the pointer 10 is moved in the other direction. The pointer 10 is normally held in zero position by the spring 15, which is fastened to the lower part of the housing in any suitable way and pressed against the stud 11. Between the spring and the projection 13, the pointer is held normally in the zero position.

The pointer 10 is bifurcated and has two hands, one of which 10a swings above the dial plate 3 and the other hand 10b swings below the dial plate 3.

Figure 4:
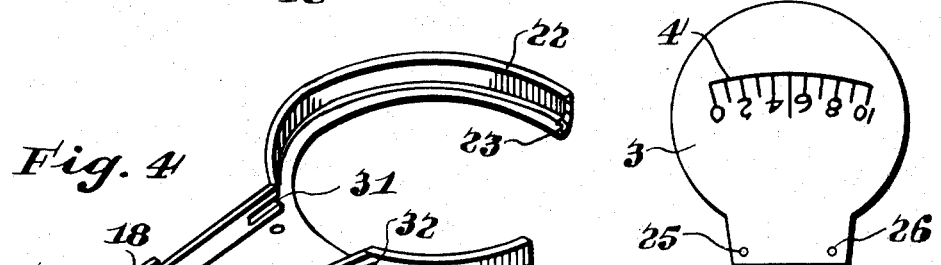
Fig. 4 is a perspective view of a part of the housing.
Figure 5:
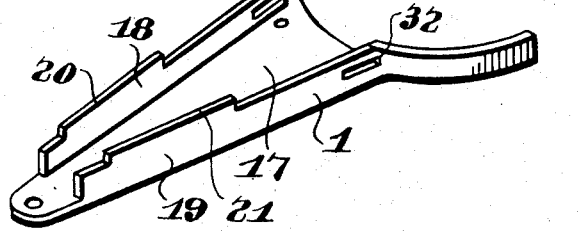
Fig. 5 is a top plan view of the dial of the indicator.

The lower part of the housing 1 has a web 17 and on each side of it is a flange 18 and 19. On each of these flanges 18 and 19 is an upward extension or tongue 20 and 21. At the right of the housing as shown in Fig. 4, the housing is formed with an annular rim 22 with an inwardly extending flange 23 on the bottom thereof, which rim and flange serves as a seat for the crystal 24 and the dial plate 3. The dial plate is provided with screw holes 25, 26 through which screws pass that engage in the web 17 and help to hold the dial plate in position.

Figure 1:
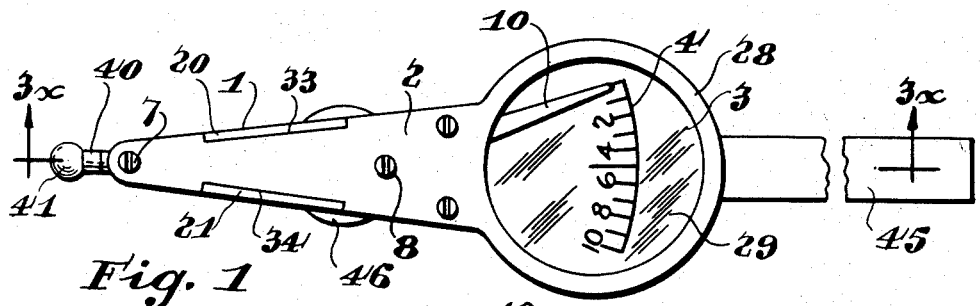
Fig. 1 is a top plan view of my improved surface test indicator.
Figure 3:
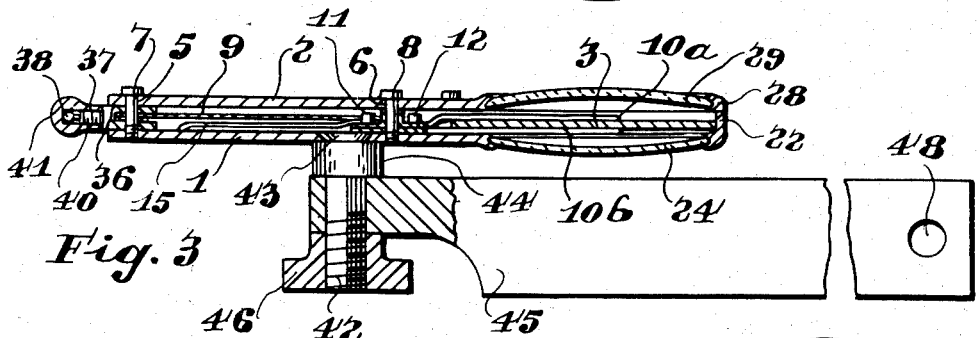
Fig. 3 is a vertical longitudinal section through the indicator on the line 3x, 3x of Fig. 1, showing the block on which the indicator is supported, which block is shown partly in section.

The cover plate 2 is triangular in shape at the left as shown in Figs. 1 and 3 and has an annular rim 28 at the right, which engages the crystal 29 and holds it in place on the rim 22.

It will be understood that between the inwardly extending flange 23 and the rim 22 there is a little groove into which the crystal can be pressed with a snap and the same kind of a groove is provided under the annular rim 28 into which the crystal 29 can be pressed so that it will be held in place thereby.

It will also be understood that at the right hand end of the flanges 18 and 19, grooves 31 and 32 are provided in which the tapered end of the dial plate 3 can engage for the purpose of holding the dial plate in position.

It will also be understood that the cover plate 2 is cut away with recesses at 33 and 34 into which engages the extensions 20 and 21 for the purpose of holding the coverplate securely in place.

It will be understood that the operating arm 9 extends to the left of the stud 7 on which it is pivoted. Also pivoted on this stud 7 is the contact element 36, which is recessed to receive the left hand end of the arm 9. On the outer end of the contact element 36 is the threaded stem 37 with a male thread thereon having the ball contact tip 38 on the end thereof. This stem and this ball contact tip are very small in diameter and are intended to engage in very small holes, or fine work.

On the outside of the threaded stem 37 is engaged a threaded sleeve 40 having a female thread on the inside thereof. On the end of this sleeve is a large ball contact tip 41 that is intended to engage in larger holes, or coarse work. This large ball contact tip is normally in place on the small tip and covers it, but when it is desired to use the small tip, the large tip can be removed and this will expose the small tip for use.

I provide a stud 42 that has a head 43 that is riveted into the web 17 of the lower part of the housing to the left of the stud 8 as shown in section in Fig. 3. This stud is surrounded by a collar 44, which spaces the housing from the block 45. The block 45 is cut away at one end and is perforated to receive the stud 42. This stud is threaded and is clamped to the loose end of the block 45 by means of the knurled head 46. This block 45 is used to clamp the indicator in place on any machine or apparatus on which it is to be used. On a lathe this block could be fastened to the carriage or it could be fastened to the height gauge for surface testing or to another machine on which it can be used and for this purpose a hole 48 is provided in which a clamping screw can be used.

It will be understood that the contact element 36 can turn on the stud 7 independent of the operating arm 9 and can take any angular position with reference thereto that may be desired. This change in position of the contact element can be made by exerting more pressure than is needed to secure the indication on the dial and in its new angular position it can again be used to indicate the position of pointer 10 on the dial. This has always been a feature of the indicator as shown in the Cash patent, and is not new with this invention.

I claim:

1. A housing for an indicator having a tapered web at one end of the housing, an upwardly extending flange on each side of the web, a tongue projecting upwardly from each of said flanges, a circular flange forming a rim at the other end of the housing, a cover plate for said housing having a tapered plate at one end thereof, a recess on each edge of said tapered plate adapted to receive and engage with the tongue on the flanges of said housing, and a circular rim at the other end of the cover plate integral therewith and lying in the plane of said plate and adapted to engage on the circular rim of the housing.

2. A housing for an indicator having a tapered web at one end of the housing, an upwardly extending flange on each side of the web, a tongue projecting upwardly from each of said flanges, a circular flange forming a rim at the other end of the housing, a cover plate for said housing having a tapered plate at one end thereof, a recess on each edge of said tapered plate adapted to receive and engage with the tongue on the flanges of said housing, a circular rim at the other end of the cover plate adapted to engage on the circular rim of the housing, a seat in each of said circular rims, said seats lying in the plane of the web and plate, respectively, and a crystal adapted to engage in each of said seats.

3. A housing for an indicator having a tapered web at one end of the housing, an upwardly extending flange on each side of the web, a tongue projecting upwardly from each of said flanges, a circular flange forming a rim at the other end of the housing, a cover plate for said housing having a tapered plate at one end thereof, a recess on each edge of said tapered plate adapted to receive and engage with the tongue on the flanges of said housing, a circular rim at the other end of the cover plate lying in the plane thereof and integral therewith and adapted to engage on the circular rim of the housing, a circular dial plate, an annular seat in the circular rim of the housing on which said dial plate can rest, and an oblong extension on one side of said dial plate adapted to engage between the flanges of the housing.

4. A housing for an indicator having a tapered web at one end of the housing, an upwardly extending flange on each side of the web, a circular flange forming a rim at the other end of the housing, a circular dial plate, an annular seat lying in the plane of said web in the circular rim of the housing on which said dial plate can rest, an oblong extension on one side of said dial plate adapted to engage between the flanges of the housing, and a bifurcated pointer having two prongs one above the other, said dial plate being located between the prongs, the prongs being visible on both sides of the dial plate.

5. A housing for an indicator having a tapered web at one end of the housing, an upwardly extending flange on each side of the web, a circular flange forming a rim at the other end of the housing, a circular dial plate, an annular seat lying in the plane of said web in the circular rim of the housing on which said dial plate can rest, an oblong extension on one side of said dial plate adapted to engage between the flanges of the housing, a bifurcated pointer having two prongs one above the other, said dial plate being located between the prongs, the prongs being visible on both sides of the dial plate, a cover plate for said housing, having a tapered plate at one end thereof, a circular rim at the other end of the cover plate formed integrally therewith and adapted to engage on the circular rim of the housing, a seat in each of said circular rims, and a crystal adapted to engage in each of said seats and enclose the dial plate and pointer and prongs.

6. A surface test indicator comprising a casing having spaced parallel flat walls, each comprising a tapered body portion and an annular bezel having an internal crystal receiving groove, said body portion and bezel of each wall being formed from an integral web of sheet material and lying in a common plane, and the diameter of said bezel being greater than the maximum width of said tapered body portion, and side wall means extending along the opposed lateral edges of said tapered body portions and around said annular bezel portion and spacing said flat walls, a circular dial mounted on said side wall means in parallel relation with said flat walls and concentric with said annular spaced bezels, and midway between the spaced walls, and a crystal mounted in each of said bezel grooves.

7. A surface test indicator comprising a casing having spaced parallel flat walls, each comprising a tapered body portion and an annular bezel having an internal crystal receiving groove, said body portion and bezel of each wall being formed from an integral web of sheet material and lying in a common plane, and the diameter of said bezel being greater than the maximum width of said tapered body portion, and side wall means extending along the opposed lateral edges of said tapered body portions and around said annular bezel portion and spacing said flat walls, a circular dial mounted on said side wall means in parallel relation with said flat walls and concentric with said annular spaced bezels, and midway therebetween, a crystal mounted in each of said bezel grooves, indicating means mounted in the tapered part of the casing formed by the body portions, said indicating means comprising parallel pointers pivoted within the tapered part and extending over the opposite faces of said dial.

GERALD C. WELCH.

References Cited in the file of this patent

UNITED STATES PATENTS

| Number | Name | Date |
|---|---|---|
| 1,021,888 | Porter | Apr. 2, 1912 |
| 1,235,551 | Cash | Aug. 7, 1917 |
| 1,348,210 | Cole | Aug. 3, 1920 |
| 1,436,111 | Reich | Nov. 21, 1922 |
| 1,445,584 | Grove | Feb. 13, 1923 |
| 1,485,247 | Carlson | Feb. 26, 1924 |
| 1,645,473 | Cash | Oct. 11, 1927 |
| 1,994,833 | Plitt | Mar. 19, 1935 |
| 2,316,677 | Edwards et al. | Apr. 13, 1943 |
| 2,341,809 | Pearson | Feb. 15, 1944 |